United States Patent
Helbling (10) Patent No.: US 11,268,730 B2
(45) Date of Patent: Mar. 8, 2022

(54) ENERGY MANAGEMENT SYSTEM CONTROLLER AND METHOD

(71) Applicant: Edward Helbling, Northport, NY (US)

(72) Inventor: Edward Helbling, Northport, NY (US)

( * ) Notice: Subject to any disclaimer, the term of this patent is extended or adjusted under 35 U.S.C. 154(b) by 11 days.

(21) Appl. No.: 16/842,913

(22) Filed: Apr. 8, 2020

(65) Prior Publication Data

US 2021/0318014 A1 Oct. 14, 2021

(51) Int. Cl.
| | | |
|---|---|---|
| *F24F 11/46* | (2018.01) | |
| *F24F 11/58* | (2018.01) | |
| *G05B 15/02* | (2006.01) | |
| *F24F 11/52* | (2018.01) | |
| *F24F 11/63* | (2018.01) | |
| *F24F 110/10* | (2018.01) | |

(52) U.S. Cl.
CPC ............. *F24F 11/58* (2018.01); *F24F 11/46* (2018.01); *F24F 11/52* (2018.01); *F24F 11/63* (2018.01); *G05B 15/02* (2013.01); *F24F 2110/10* (2018.01); *G05B 2219/2642* (2013.01)

(58) Field of Classification Search
CPC .. F24F 11/58; F24F 11/52; F24F 11/46; F24F 11/63; F24F 2110/10; G05B 15/02; G05B 2219/2642
USPC ........................................................ 700/276
See application file for complete search history.

(56) References Cited

U.S. PATENT DOCUMENTS

| | | | | |
|---|---|---|---|---|
| 10,620,813 B1* | 4/2020 | Riley | .................. | G06F 3/04847 |
| 2004/0065095 A1* | 4/2004 | Osborne | .................. | F24F 3/00 |
| | | | | 62/160 |
| 2009/0243535 A1* | 10/2009 | Erdmann | ................. | H02P 25/28 |
| | | | | 318/813 |
| 2010/0211224 A1* | 8/2010 | Keeling | .............. | F24F 13/0209 |
| | | | | 700/277 |
| 2011/0302937 A1* | 12/2011 | Bujak, Jr. | ............. | F25D 21/125 |
| | | | | 62/80 |
| 2012/0193437 A1* | 8/2012 | Henry, Jr | .................. | F24F 11/30 |
| | | | | 236/51 |
| 2014/0156088 A1* | 6/2014 | Li | .......................... | G05B 15/02 |
| | | | | 700/278 |
| 2016/0139582 A1* | 5/2016 | Matsuoka | ............... | G05B 15/02 |
| | | | | 700/276 |
| 2016/0327293 A1* | 11/2016 | Grabowski | .............. | F24F 11/30 |
| 2016/0377474 A1* | 12/2016 | Stillman | ................. | G01F 23/62 |
| | | | | 340/618 |
| 2018/0066863 A1* | 3/2018 | Hatch | ...................... | F24F 11/62 |

(Continued)

*Primary Examiner* — Kenneth M Lo
*Assistant Examiner* — Michael W Choi
(74) *Attorney, Agent, or Firm* — John F. Vodopia (57) ABSTRACT

A technical adapter system operates to wirelessly, remotely control a conventional thermostat and/or components of an HVAC system, HVAC/R system or both, to which the conventional thermostat is connected, and optimizing energy efficiency of the HVAC system components. This effectively heats and/or cools a space or volume that the HVAC and/or HVAC/R system is configured to heat and/or cool. An adapter device includes a processor, a memory and an adapter application program component, the adapter device configured to connect to the conventional thermostat, the HVAC system or both. A hand-held electronic device including a smart device application program component that operates to enable a hand-held electronic device user to wirelessly connect to the adapter device, and remotely control and command the adapter device.

18 Claims, 7 Drawing Sheets

(56) References Cited

U.S. PATENT DOCUMENTS

| | | | |
|---|---|---|---|
| 2018/0274809 A1* | 9/2018 | Matsuhara | F24F 11/89 |
| 2021/0123625 A1* | 4/2021 | Yan | F24F 11/47 |
| 2021/0150380 A1* | 5/2021 | Verteletskyi | G06F 16/906 |

* cited by examiner

ENERGY MANAGEMENT SYSTEM CONTROLLER AND METHOD

BACKGROUND OF THE INVENTION

The invention broadly relates to heating, ventilation and air conditioning (HVAC) systems and, relates more particularly to a technical support system including a technical support device that is connected to wires of a conventional thermostat of an HVAC and/or HVAC/R system, and a hand-held electronic device, for monitoring and testing components of the HVAC and/or HVAC/R system normally controlled by the conventional thermostat, a technical adapter system including a technical adapter device that connects to a conventional thermostat of an HVAC and/or HVAC/R system, a hand-held electronic device, and monitoring devices, for controlling and/or, where necessary, overriding the conventional thermostat, thereby managing operation and energy efficiency of the HVAC and/or HVAC/R system components, and the heated and/or cooled space, in reliance upon monitoring data, a thermostat control system including a thermostat device, a hand-held electronic device, and monitoring devices, for controlling the HVAC and/or HVAC/R system components, thereby managing operation and energy efficiency of the HVAC and/or HVAC/R system components, and the heated and/or cooled space, in reliance upon monitoring data received from the monitoring devices, or other data available data; and an application program including a software component for operation in a hand-held electronic device, such as a smart-phone, and/or a software component for operation in the technical support device and/or the adapter device and/or the thermostat device, and/or a software component for operation in server operating as a remote control center, where the components operate to allow a user to wirelessly control the respective technical support, technical adapter system and thermostat control systems, via respective hand-held electronic devices.

SUMMARY OF THE INVENTION

The present invention overcomes the shortcomings of the prior art.

A benefit of the technical adapter system, including a technical adapter device and a hand-held electronic device, is that the technical adapter system avoids replacing existing conventional thermostats while upgrading into a wireless thermostat control of existing HVAC and/or HVAC/R system components. The technical adapter system improves efficiency of existing home/business HVAC and/or HVAC/R system components, enhancing their overall temperature control and power saving capabilities in spaces in which they operate and by enhancing a user's ability to control and manage HVAC system's energy efficiency therefor from anywhere off-site of the location.

In an embodiment, the invention provides a technical adapter system for wirelessly remotely controlling a conventional thermostat and/or components of an HVAC and/or HVAC/R system to which the conventional thermostat is connected, and optimizing energy efficiency of the HVAC system components, thereby effectively heating and/or cooling a space or volume that the HVAC and/or HVAC/R system is configured to heat and/or cool.

The technical adapter system comprises an adapter device including a processor, a memory and an adapter application program component. The adapter device is configured to connect to the conventional thermostat and/or the components of the HVAC and/or HVAC/R system, to control the conventional thermostat and/or HVAC system components. The technical adapter system includes a hand-held electronic device having a smart device application program component that operates to enable the hand-held electronic device user to wirelessly connect to the adapter device, and remotely control and command the adapter device and, therefore, the conventional thermostat.

The adapter device is adapted to implement an override function that overrides the conventional thermostat setting to directly control the HVAC and/or HVAC/R components. The system may include a central management system, wherein the central management system comprises a computer server and a management system application program component, which, during operation, forms a direct communication with the smart device application program component operational in the hand-held electronic device to effect thermostat control. Preferably, the adapter device is a stand-alone device that is mounted and connected directly to existing HVAC equipment.

The technical adapter system has a first connector that effects connection of the adapter device to the HVAC and/or HVAC/R system components and a second connector that effects connection of the adapter device to the conventional thermostat. The first and second connectors together effectively bypass the wire configuration between the conventional thermostat and the HVAC and/or HVAC/R system components. The technical adapter system may further include a technical support device configured to connect to conductors connecting the conventional thermostat to the HVAC and/or HVAC/R system components, wherein the technical support device includes means for communicating wirelessly to the hand-held electronic device and a support device application program component configured to be controlled by the smart device application program component to implement monitoring functions, and testing functions, on the HVAC and/or HVAC/R system components and conductors.

The technical adapter system also may include one or more wireless HVAC interface devices configured for connecting to an HVAC and/or HVAC/R system component and wirelessly communicating to the hand-held electronic device and the smart device application program component operational therein.

The technical adapter system also may include a wireless police lock with smoke and fire sensor configured for connecting to an HVAC and/or HVAC/R system component and wirelessly communicating to the hand-held electronic device and the smart device application program component operational therein.

The technical adapter system also may include a package HVAC A/C condensing unit heat pump configured for wirelessly communicating heat pump data to the hand-held electronic device and the smart device application program component operational therein.

The technical adapter system also may include at least one wireless GPS unit locator, the GPS unit locator configured for connecting to an HVAC system component and wirelessly communicating to the hand-held electronic device and the smart device application program component operational therein to support identifying a location of said HVAC system component.

The technical adapter system also may include a magnet mounted external fuel tank sensor, adapted to be connected to a fuel tank, and configured for wirelessly communicating to the hand-held electronic device and the smart device application program component operational therein an amount of fuel in the fuel tank.

The technical adapter system also may include a wireless occupancy proximity camera arranged to monitor persons coming and going from the space or volume for which the HVAC and/or HVAC/R system is intended to heat and/or cool, and for wirelessly communicating a number of persons and/or a time that each of a number or persons is present in the space or volume to the hand-held electronic device and application program component operational therein. Preferably, the adapter application program component, the smart device application program component or both, implement a cycling function to optimize energy efficiency of the HVAC and/or HVAC/R system.

The cycling function relies on occupancy data, internal temperature conditions and real time whether conditions. For that matter, the adapter application program component, the smart device application program component or both, modifies cycle rates along with temperature settings, during periods where the zone or space that the HVAC and/or HVAC/R system components are configured to heat and/or cool is occupied and unoccupied, using a preset sliding temperature scale of minimum and maximum range of settings by increasing or decreasing cycle rates based on time-varying parameters. The time-varying parameters are selected from a group consisting of: information of outdoor ambient temperature, received from local internet weather channels, current occupancy, motion sensors data, on board temperature sensors and remote proximity camera conditions.

During operation of an initial setup function, the adapter application program component, the smart device application program component or both calculate HVAC and/or HVAC/R system component capacity required for conditioning occupied space based on square footage, and/or volume and/or minimum and maximum occupancy, to allow the adapter system to frequently adjust output rates during occupied and unoccupied periods, to optimize energy efficiency. The adapter device further includes on-board relays controlled by the adapter application program component to enable various types of control circuit wiring utilizing a single or dual, independent transformer circuit to energize cooling and heating when independent control power is required to connect auxiliary, boilers, remote duct heaters, boiler pumps and other heating devices for heating applications without requiring additional isolation relays. Preferably, the adapter device includes on-board relays to operate heat pumps using two independent transformers, a primary transformer to operate the basic heat pump, while the second transformer operates auxiliary heating devices to reheat cold air flow during a defrost cycle of a heat pump system, and wherein during a defrost cycle, accepts defrost control power signals from the heat pump defrost master to manage the heating circuits.

In another embodiment, the invention provides a wireless thermostat system for remotely controlling components of an HVAC and/or HVAC/R system, manually or automatically, to optimize energy efficiency of the HVAC and/or HVAC/R system components and a space or volume of which the HVAC and/or HVAC/R system components are arranged to heat and/or cool. As such, the wireless thermostat system includes an inventive thermostat device configured to wirelessly connect to the components of the HVAC and/or HVAC/R system. The thermostat device includes a thermostat application program component that is operated to control the HVAC and/or HVAC/R system components. The wireless thermostat system also includes a hand-held electronic device with a smart device application program component that is operated to enable a hand-held electronic device user to wirelessly connect to and communicate with the thermostat application program component operational in the thermostat device.

Based upon sensor data derived either from the space or volume, or available from an outside data source, the thermostat device and/or hand-held electronic device application program components effectively control the thermostat device and/or the HVAC and/or HVAC/R system components. Preferably, the wireless thermostat system includes a central management system comprising a computer server and a management system application program component that is operated to communicate with the smart device application program component operational in the hand-held electronic device, and control the smart device application program component, the thermostat device application program component or both. Alternatively, the computer server and a management system application program component may communicate directly and thereby directly control the inventive thermostat device.

The wireless thermostat system is programmed to maintain optimal HVAC cycle rates along with opening and closing time temperatures for the space or volume. The system monitors to determine a closely approximated number of persons present in an area within the space or volume and adjusting a cycle rate for heating and or cooling while keeping the temperature within a predetermined range. Capacity control is accomplished by activating multiple stages of cooling or heating and reducing or increasing the cycle rates of the HVAC system. The cycle rates derive from detected temperature patterns of a target area. The wireless thermostat device can exercise HVAC system components to test and ensure reliable operations. The computer server operates as a central communications hub of which both the wireless thermostat and smart device relies for communication.

In an embodiment, the invention provides a technical support system for monitoring and testing components of an HVAC and/or HVAC/R system that are normally controlled by a conventional thermostat. The technical support system comprises a technical support device including a processor and a memory and a hand-held electronic device such as a smartphone. The technical support device is configured to enable connection to a conventional thermostat that is connected to the components of the HVAC and/or HVAC/R system, and is programmed to implement monitoring and testing functions on the HVAC system components and/or on conductors connecting the HVAC and/or HVAC/R system components. The hand-held electronic device or smartphone is programmed to enable wireless connection to the technical support device to remotely control the technical support device, including remotely executing the monitoring and testing functions relating to the HVAC system components.

The technical support device is connected to a control terminal strip of the conventional thermostat, and preferably includes a display touch pad, and is programmed to present display screens that allow touch input by a user to directly control the technical support device to execute the monitoring and testing functions.

BRIEF DESCRIPTION OF THE DRAWINGS

The invention will be described in conjunction with the following drawings in which like reference numerals designate like elements and wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Technical Support System

Figure 1:
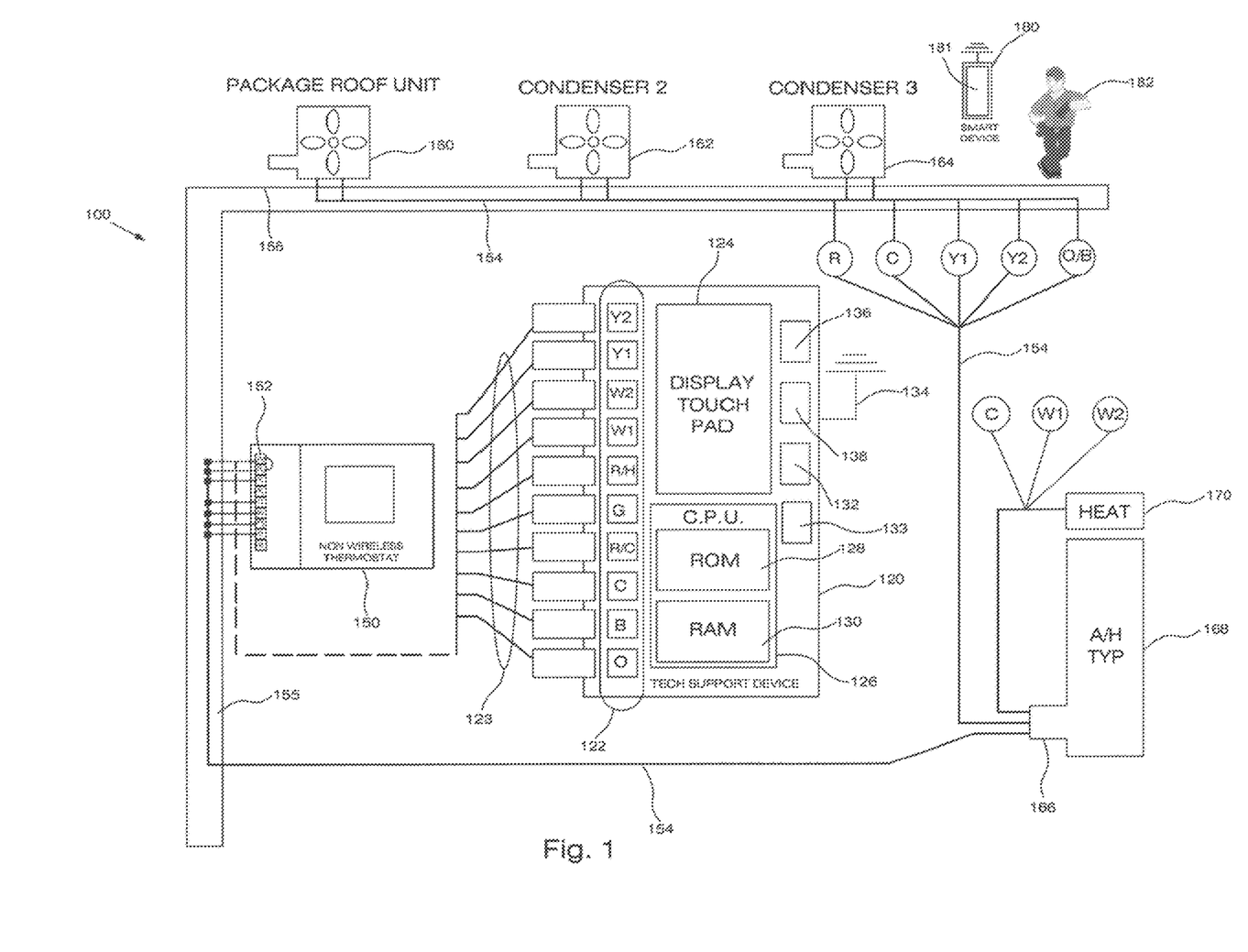
FIG. 1 presents an exemplary embodiment of the technical support system of the invention.

In a first embodiment, as depicted in FIG. 1, the invention provides a technical support system 100, including a technical ("tech") support device 120 configured to connect to wires connecting a conventional thermostat of an HVAC and/or HVAC/R system to the HVAC and/or HVAC/R system components, and a hand-held electronic device 180. Common HVAC system components are known to include cooling or air conditioner ("AC") components, such as "package roof unit" 160, "condenser 2" 162, "condenser 3" 164, a control junction 166 for an air handler 168, a heating unit or coil 170, etc., without limitation. Please note that hereinafter, the term "HVAC" shall be used to refer to HVAC or HVAC/R and both HVAC and HVAC/R. The technical support system 100 is configured for monitoring and testing components the HVAC system components, which are normally controlled by the conventional thermostat.

The technical supporter system 100 includes a technical support device (technical supporter or tech supporter) 120 and a hand-held electronic device 180. The technical support device 120 is adapted to temporarily connect to the control terminal strip 152 of the conventional thermostat 150 via a set of jumper wires 123 (or the like). The control terminal strip 152 connects to the existing thermostat wiring, which is typically found in a wall 155 or ceiling 156 of a house, business or apartment building (hereinafter referred to in the aggregate interchangeably as "building") in which components of the HVAC system are installed. The reader should note that while the jumper wires 123 are shown connected to the control terminal strip 152 of conventional thermostat 150, the jumper wires 123 also may be connected directly to the existing wires 154, as known to those with ordinary skill in the art.

The hand-held electronic device 180, may embody a smartphone, computer tablet or other hand-held control device (referred to interchangeably hereinafter as a "smart device" or "smartphone"), as long as the smart device 180 is capable of communicating with the technical supporter 120, remotely, for example, via the Internet. Hence, a user 182 may use the smart device 180 to remotely operate and test the components of the HVAC system in reliance upon the technical supporter 120, for example, while moving around the building or home from various locations. The technical support device 120 is controlled indirectly by the smart device 180 to implement test routines to test the HVAC system and system components for shorted wires, continuity, defects in relays, interfaces, power supplies, faults in the wiring 123, 154, the thermostat 150, control terminal strips (such as control terminal strip 152), HVAC system components (for example, 160, 162, 164, 150, 152, 154), etc. (without limitation). The technical supporter device 120 then transfers related testing data wirelessly to the smart device 180, for processing and/or communication, thereby, as needed.

As shown in FIG. 1, the technical supporter device 120 includes, without limitation, a control terminal strip 122, connected to the jumper wires 123, a display device (e.g., a "display touch pad") 124, a central processing unit ("CPU") 126, a read-only memory ("ROM") 128, a random access memory ("RAM") 130, an I/O device or module 132, a MODEM 133 and an antenna or other means for communicating 134, such as via Wi-Fi, as shown. The ROM 128 can store the instructions comprising the software component of the application program operational in the tech support device. And while FIG. 1 shows the ROM 128 and RAM 130 as part of the CPU 126, these also may be separate elements connected to the CPU 126, for example, via a bus (not shown), without deviating from the spirit of the invention. I/O device or module 132 communicates with an antenna 134 for sending and receiving signals to/from the smart device 180, for example, via a router, or like device, and the Internet.

During intended operation, the user 182 has a choice with on board selector mode switches (physically present on the technical support device 120) to randomly select the conductors (e.g., wires 154 of the HVAC system he/she chooses to check). This also may be accomplished with "virtual" selector mode switches presented by the display touchpad 124 (not shown), implemented by the software component operational therein, and/or by the physical switches at the technical support device (not shown), by which the conductors (or wires) may be selected for testing directly at the actual physical selector mode switches. The technical supporter device 120 and related software application enable users to select modes to check for power-related faults, shorts, continuity issues, open conductors, relay coil operability, etc., in the HVAC system, and send data results to the smart device or energy management system operational at a remote server.

The technical supporter device 120 also implements a mode function, and includes a corresponding mode actuation "button" 136. Mode actuation button 136 may be as an actual physical button (as shown in FIG. 1) or may be a virtual button that is presented or displayed on the display touch pad 124 or on display 181 of the smart device 180. The mode actuation button 136 enables a user to activate various sub-functions that energize individual HVAC system components, such as fans, heat units, compressors, reversing valves on heat pump systems independently of one another, and view actual functions remotely.

So, for example, if a user is outside of the space heated and/or cooled by the HVAC system, or on a roof of the building bounding the space, he/she can trigger and energize, for example, the air handler 162 or other HVAC components for testing, etc. Preferably, the technical support device 120 includes a temperature sensor 138, which is either part of the actual CPU (not shown) or coupled to the CPU. Additionally, the mode function (activated using mode actuation button 136), enables the user to join all necessary HVAC system components for testing and operation.

Technical Adapter System

Figure 2:
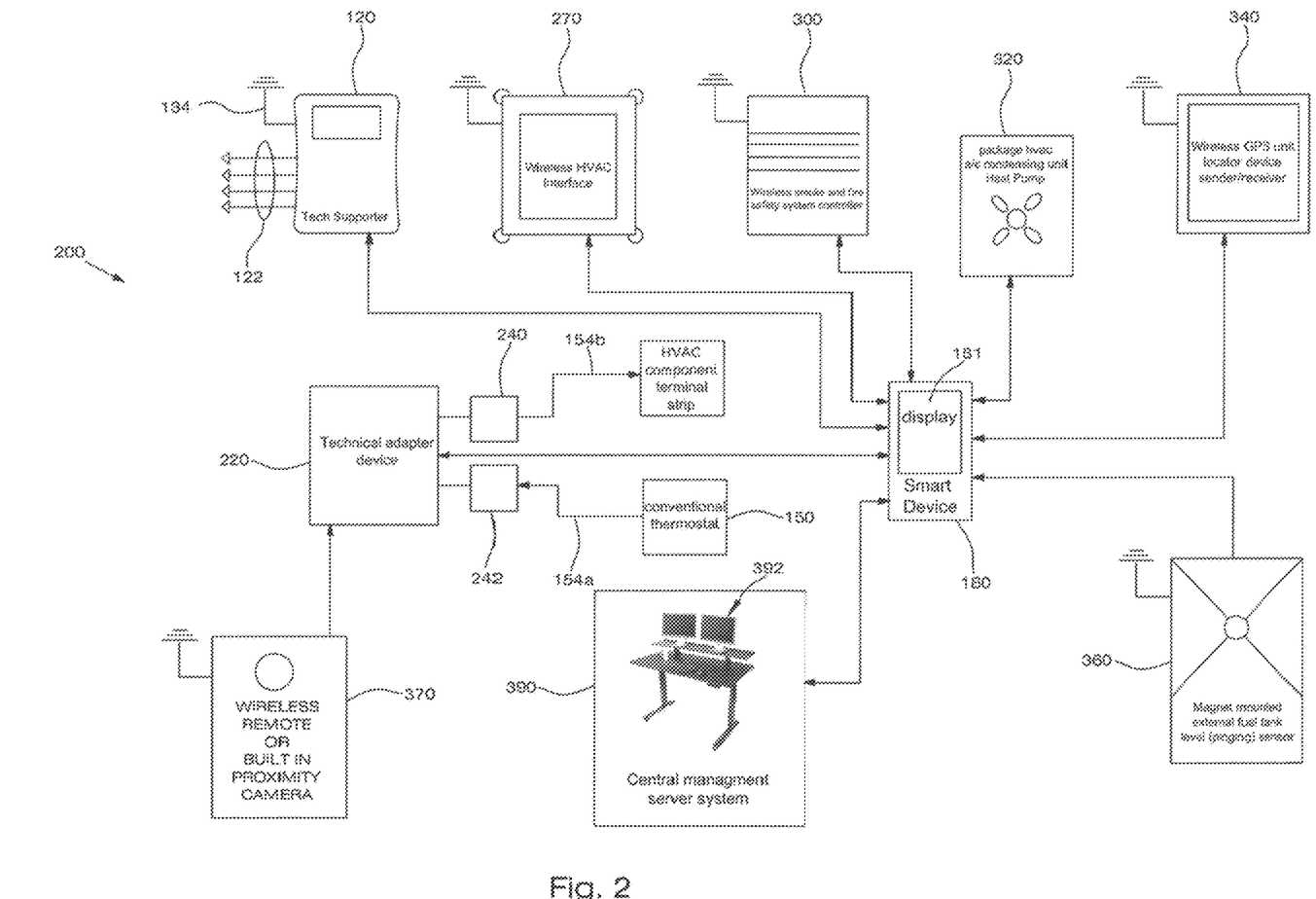
FIG. 2 presents an exemplary embodiment of the technical adapter system of the invention.

In another embodiment, the invention provides a technical adapter system 200 including a technical adapter device configured to connect to a conventional thermostat of an HVAC and/or HVAC/R system, a hand-held electronic device, and monitoring devices, the technical adapter system configured for controlling and/or, where necessary, overriding the conventional thermostat, thereby managing operation and energy efficiency of the HVAC and/or HVAC/R system components, and the heated and/or cooled space, in reliance upon data received from the monitoring devices, or other available data.

FIG. 2 presents an exemplary embodiment of the technical adapter system 200, as well a conventional thermostat 150, and several HVAC system components. The technical adapter system 200 includes an adapter device 220 (referred to interchangeably hereinafter as "adapter"), a first connector 240 for connecting the adapter device to existing field wires 154b, which connect to various HVAC system components, a second connector 242, for connecting the thermostat 150 to the adapter device 220 via wires 154a, a hand-held electronic device 180, a tech supporter device 120, wireless HVAC interface 270 (installed at HVAC system components), a wireless police lock and smoke and fire sensor system 300, a package HVAC a/c condensing unit heat pump 320, a wireless GPS unit locator 340 (installed at HVAC system components) and magnet mounted external fuel tank level (pinging) sensor (or sensor system) 360 (installed on a fuel tank as the case may be), a wireless occupancy proximity camera 370, and a central management system 390, comprising a central management system server 392 (at times referred to herein as "cloud server") in which a set of instructions comprising an application program implementing system management control is operational.

The thermostat 150 is previously hardwired (via existing thermostat wires 154 (FIG. 1) or 154b (FIG. 2) to the heating and/or cooling components of the HVAC system. The technical adapter 220 includes the same hardware components, and stores and processes computer instructions for operating a similar application program component as the technical supporter 120, described above, but for the interactive display device 124 and an ability to implement the above-described testing and control therethrough. That is, the software component operational in the adapter device 220, while capable of carrying out many of the functions implemented by the technical support device 120, does not normally implement instructions that normally rely on a display touch pad 124. The adapter device 220 also wirelessly communicates with a smart device 180, for example, via MODEM 133 and antenna 134, and as the case may be, the remote energy management system 390 operating on central management system server 392.

Figure 3:
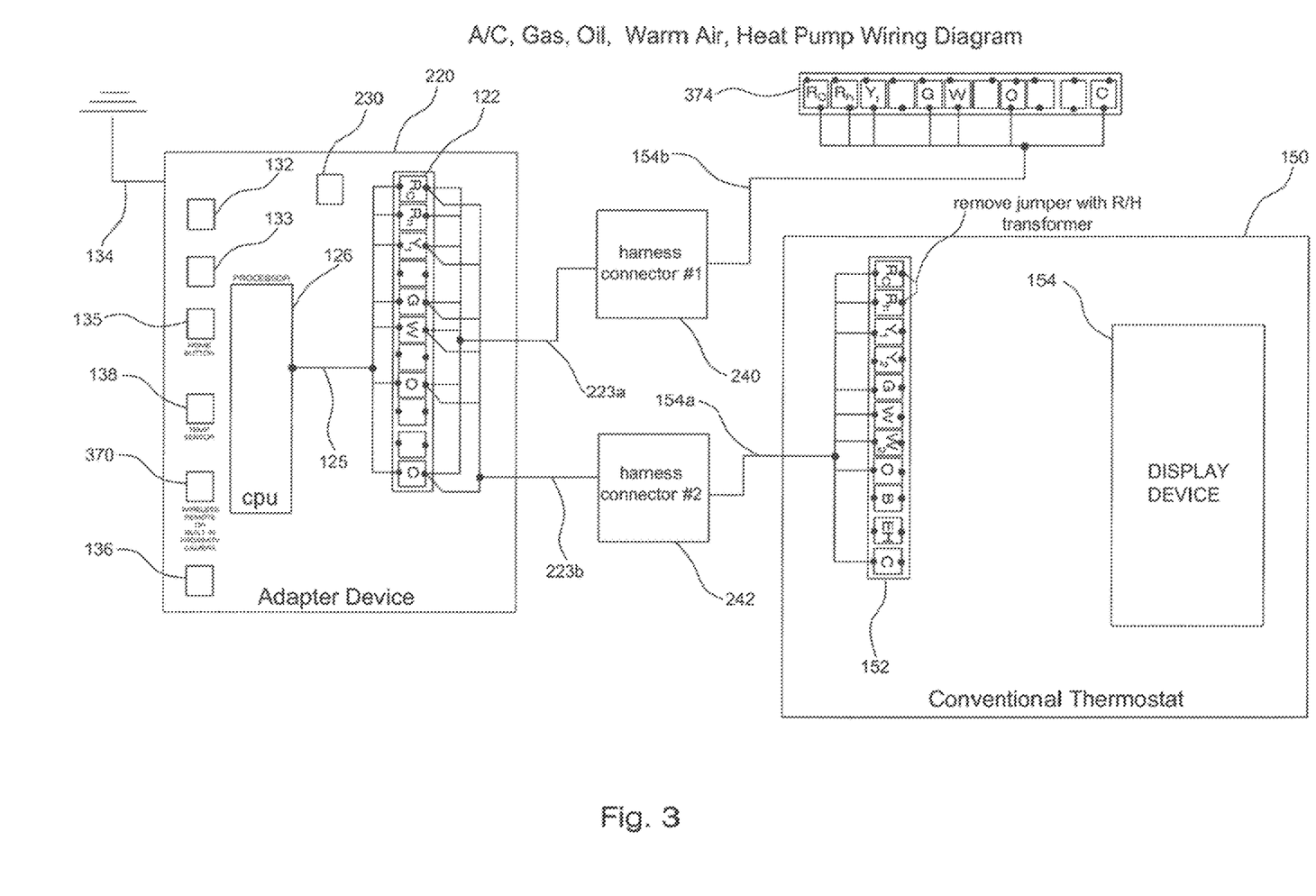
FIG. 3 presents an A/C, gas warm air, heat pump wiring arrangement for use with the technical adapter system depicted in FIG. 2.

As shown in detail in FIG. 3 (A/C, Gas, Oil, Warm Air, Heat Pump Wiring Diagram), the first connector 240 and second connector 242 essentially are wiring harnesses. The first connector 240 is connected to the adapter device 220 via wires 223a and control terminal strip 122, and to the existing field wires 154b to the various HVAC system components, represented by HVAC control terminal strip 374. The second connector 242 is connected to the adapter device 220 via wires 223b and control terminal strip 122, and to the control terminal strip 152 of thermostat 150, also via existing filed wires 154a. The signals that pass through the first and second connectors pass from the control terminal strip 122 to the CPU 126 for processing, either directly hardwired or coupled through a bus 125. The CPU 126 (preferably through an internal bus) exchanges signals with the smart device 180 wirelessly, for example, through the I/O (input/output) device 132, MODEM 133 and antenna 134. The adapter device 220 operates to control the HVAC system (i.e., the individual HVAC system components) as a primary control by controlling the conventional thermostat 150.

Figure 4:
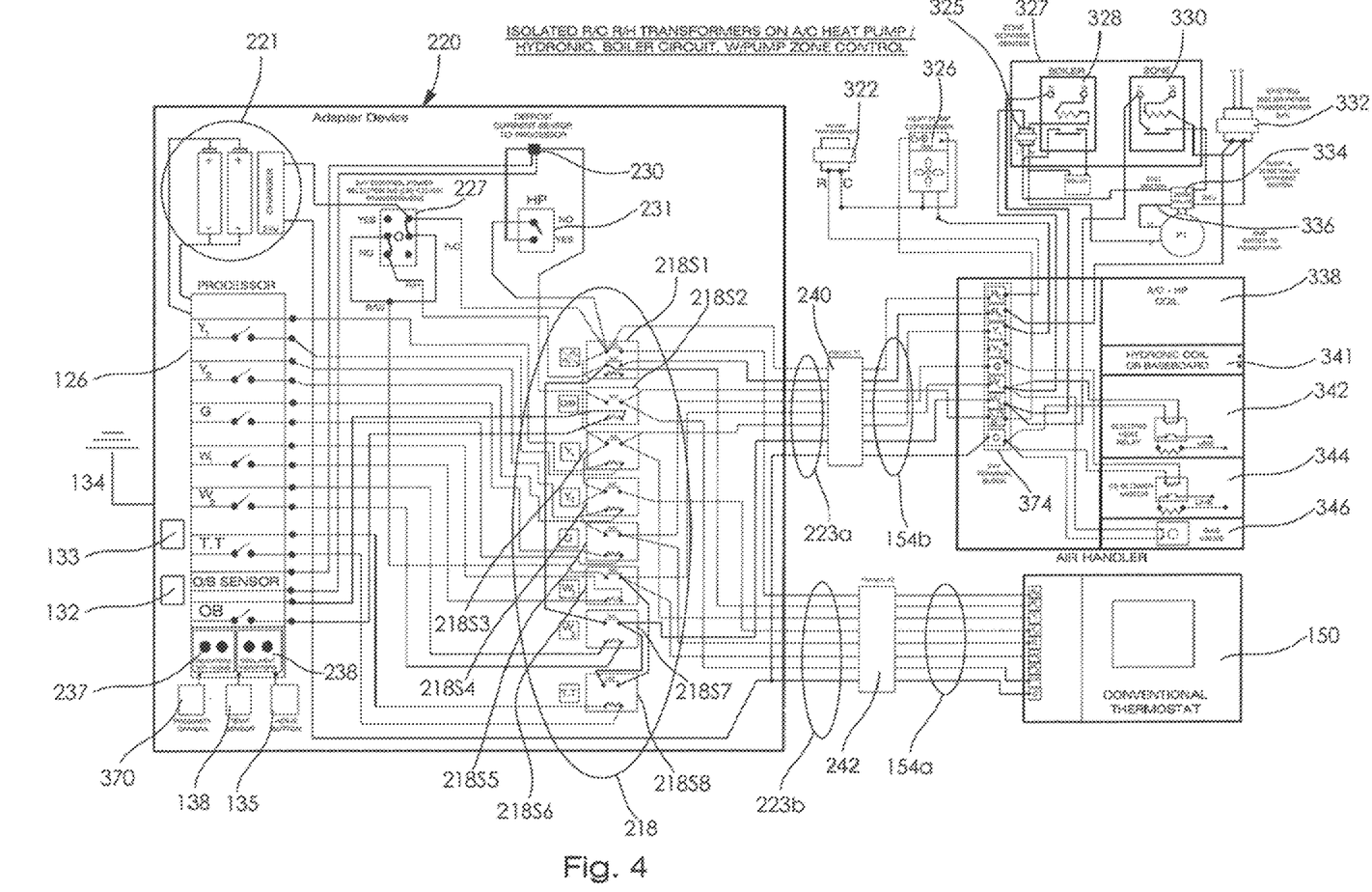
FIG. 4 presents details of the adapter device in communication with other adapter system elements, and HVAC system components, according to the invention.

In addition, the adapter device 220 includes micro dip switches (not shown expressly in FIG. 3) to enable set-up of isolated circuits having separate transformers, usually found on boilers that require dry contacts to make. The adapter device 220 can be configured to operate to control the HVAC system components indirectly by controlling the existing thermostat 150, for example, that controls an HVAC system with a primary transformer 322, a heat pump condenser 326, a zone control center 327, which includes boiler 328 and zone switch 330, as shown in FIG. 4. Also shown in FIG. 3 are an existing boiler room transformer (24V) 332, a pump & zone valve with end switch 334, an end switch to power pump 336, an A/C-HP coil 338, a hydronic coil or baseboard pump 341, an electric heat relay 341, a (G) blower motor 344 and a gas valve 346.

FIG. 4 (Isolated R/C R/H transformers on A/C Heat Pump/Hydronic, Boiler Circuit, w/Pump Zone Control) depicts an a/c/heat pump wiring diagram with boiler single or dual transformer control. Such arrangement enables the HVAC system (and system components), in reliance upon the inventive technical adapter device 220, to operate dual fuel systems, using, oil, gas, electric, hydronic heat coil system combination, without having to add additional isolation relays or aquastats. By setting the micro dip switches 218, i.e., $R_C/R_H$ 218S1, O/B 218S2, Y1 218S3, Y2 218S4, G 218S5, W 218S6, W2 218S7, and T.T 218S8, a user can, for example, isolate the R/H heating transformer circuit and allow the R/C primary transformer to operate a heat pump requiring the R/C transformer power, with a separate R/H transformer in tandem that feed separate heating control circuits. Put another way, the micro dip switches 218S1-S8, when set, allow the CPU 126 to actuate the corresponding relays ($R_C/R_H$, Q/B, $Y_1$, $Y_2$, G, $W_1$, $W_2$, and T.T). The user can implement a dry relay circuit or combine the R/H and R/C circuits to operate as one transformer system, in reliance upon switch 218s1 as shown.

The (W) circuits for heating can also be set up to control any low voltage circuits having separate 3rd transformer systems (see, for example, zone panel 327 of FIG. 4) that are sometimes found in integral duct or air-handler electric re-heat or auxiliary systems using the T.T dry contacts in systems that are integrally powered with their own control power transformer. Please note that the adapter device 220 also includes an optional battery charger 221, a 24V control power selector R/C (or) RVC-RH transformers 227, a defrost current sensor to processor or CPU 230, and heat pump (HP) switch 231 directly connected to the processor or CPU 126, and respective Wi-Fi/Home and Cool/Heat indicator lights 237, 238, controlled by the CPU.

The wireless adapter device 220 also provides basic thermostat functions, as well as 7 day programmable scheduling. As the preferred embodiment of the adapter device 220 does not have a display device, for example, as do the technical supporter 100 and the thermostat device 420 (see below), the wireless adapter 220 may be said to be designed as a "black box" product (sometimes referred to as a "headless" device). No display device means no control panel in the device (220) itself, other than the home override switch 135. Use of the adapter device 220 can prevent misuse of temperature set points by renters/tenants, i.e., from overriding temperature set points beyond allowable ranges, typically when the renter/tenant is not responsible for heating costs.

There are many advantages by upgrading an existing HVAC system's conventional thermostatic control by implementing and using the technical adapter system 200, the least of which is being able to wirelessly control HVAC system component operation wirelessly for remote control, testing and trouble shooting. For example, a user/owner of a rental space within which the technical adapter system 200 and adapter device 220 is installed can remotely allow a minimum to maximum temperature set point range for tenants use in the rental space (or zone) for any reason to over-ride set-back modes. The adapter device 220 also allows an owner to block the "home" override button 135, for example, when "misuse" is detected, for example, by the on-board temperature sensor of the adapter device. The adapter home button 135 enables a user to control their conventional thermostat 150. While in home mode, the occupant controls their original thermostat to control the system setting, while the adapter device 220 remains connected to the cloud server 392, and continues to monitor temperature and equipment status locally. In case where the occupant is unable to, home mode can be switched either at the adapter device 220, or remotely over the Internet.

The conventional thermostat 150 to which the adapter device 220 is connected, is controlled via the component of the application program operational in the smart device 180, in reliance upon control signals transmitted wirelessly. Once the adapter device 220 is installed in an HVAC system, the user still can use the previously-installed conventional thermostat 150, or switch over to Wi-Fi control using the adapter device 220 commanded by the smart device 180. The adapter device 220 is adjusted from anywhere using the smart device 180. Moreover, at any time, the user can switch control back (via the smart device 180 or the physical buttons on the adapter device 220) to their conventional thermostat 150 for safety and backup operation of their HVAC system (for example, via the home button 135 on the adapter device).

The application program turns a user's smart phone, i.e., smart device 180, into what is essentially a virtual thermostat controller, in reliance upon the virtual control mechanisms presented as display images on the smart devices' display device 181. The adapter system 200, through the smart device 180, maintains communication and control of the adapter device 220, and therefore, the conventional thermostat 150 at the user' home or business in which the adapter device is installed/connected to the existing thermostat.

Wirelessly

As shown in FIG. 2, the technical adapter system 200 is connected or coupled to wireless police lock with smoke & fire sensor system 300 (FIG. 2). The wireless police lock with smoke & fire sensor system 300 operates with the adapter device 220 (and/or the wireless thermostat (COBRA™) module depicted in FIG. 5) to add a security feature to the inventive adapter system 200. For example, the wireless police lock with smoke & fire sensor system 300 might be used with a homeowner's garage door to thwart known cases where burglars might capture a home owner's garage door access code and use same for illegal garage entry. The wireless police lock with smoke & fire sensor 300 also includes a smoke detector element and fire sensor element. For safety reasons, the wireless police lock with smoke & fire sensor system includes an override so people on the premises can exit in a hurry in an emergency, and a loss of power. The wireless police lock with smoke & fire system is not limited to associated secondary smoke/fire dampers, first doors, entrance, exit, garage doors, circulator pumps, electrical switches, power outlets.

The adapter system 200 also is shown connected to a package HVAC A/C condensing unit A/C, heat pump 320. The adapter system 220 operates with the wireless thermostat cobra module depicted in FIG. 5)).

The adapter system 200 also is shown attached to wireless GPS unit locator 340 installed in or proximate to an HVAC system component, as shown in FIG. 2. The wireless GPS unit locator 340 operates with the adapter device 220 with a dedicated pairing identity serial number of wireless thermostat device (FIG. 4; 420) and the Central management server system depicted in FIGS. 2 and 5)

The adapter system 200 also is shown connected to a magnet-mounted external fuel tank level (pinging) sensor 360. The magnet-mounted external fuel tank level (pinging) sensor 360 operates with the adapter device 220 ((and/or the wireless thermostat device 420 in FIG. 5) to remotely determine exactly how much fuel is left in a fuel reservoir or tank. The level (pinging) sensor 360 generates a sound signal (e.g., u/s) at a frequency commonly used in such devices, and processes the echo signal returned. Based on the processing, a communication signal may be generated and transmitted to the smart device 180 to alert an owner of a low fuel condition, or to a supplier to automatically order a fuel delivery.

The adapter system 200 also is shown connected to a wireless occupancy proximity camera 370. The wireless occupancy proximity camera 370 is in wireless communication with the adapter device 220 (and/or the wireless thermostat device 420 depicted in FIG. 5) allows the software operational in the adapter device (and or that operational in the smart device or the server) to track the numbers of persons present in the space or zone controlled by the thermostat (i.e., the net in when viewing all those entering and exiting a space or zone) to accurately assess an amount of body heat generated by the persons present. Accurately assessing the amount of body heat sets the stage for the processing that then optimizes the heating/cooling, as will be explained in greater detail below Application Program As mentioned, the technical adapter system 200 includes an application program component for operational in the smart device 180, and an application program component for operation in the adapter device 220. Alternatively, the system may also include an application program component operational in the server 392. The application program component in the smart device 180 controls the adapter device 220, in response to the command signals received from the application program component (operational in the smart device 180), but for the independent operation of the home button 135 and the micro dip switches 218, i.e., $R_c/R_H$ 218S1, O/B 218S2, Y1 218S3, Y2 218S4, G 218S5, W 218S6, W2 218S7, and T.T 218S8. Hence, the application program component in the smart device 180 includes and operates a feature in the set up mode of operation for occupied and unoccupied conditions. For example, the adapter device 220 recognizes the thermostat's preprogrammed temperature set points, and/or allows a user to input preprogrammed temperature set points (through the smart device 180 and application program component operational therein). The temperature set points in occupied mode has a programmable minimum and maximum operating temperature range, e.g., a maximum of 70 degrees heating and maximum 72 cooling degrees.

Human Occupancy Energy Efficiency Calculations

An inventive feature is the invention's reliance upon human body heat output, i.e., that each person's body operates like an additional heating system radiator (but with a slower rate of propagation, that for example, a radiator that might be part of the HVAC system. So the system (e.g., CPU 126 or application program portion operational therein) counts the number of people, calculates their BTU output and adjusts operation based upon the equipment's BTU output rating in view of the BTU output attributable to persons present. Then the system (e.g., the CPU 126 or application program portion operational therein) prefixes the set temperature and stops the HVAC equipment run at a temperature adjusted for the exact percentage calculated, with the expected estimate that human heat provides the offset percentage to satisfy setting. The range of the given adjustments are between the set temperature and cutout temperature (typically 2 degrees below set, can be adjusted).

For example, with the set temperature=72, and cutout temperature is minus 2=70, Range=2. So, if enough people present in the space or volume is equal 15% of the equipment BTU output, then the heating system would be controlled to be shut off at 15% of range below set temp (71.7). The human heat will be realized mostly by individuals standing close to each other. Most of that human convection BTU is absorbed through thermal losses before ever reaching the thermostat. The end result is a precise temperature offset based on the number of humans emitting body heat into a given area for each cycle. Cooling involves the inverse calculations for each element of the formula, where the equipment is shut off above the set temp when fewer people are present. The average percentage would be based on total legal occupancy count minus the number of occupied persons.

However, AC would only realize a savings when the room is less occupied, since human body heat works against the cooling; energy savings is typically achieved when this feature is used with heating. Other features: outdoor temperature and cycle rate adjustment is a separate energy savings feature. Additionally, equipment cycle rates will be co-managed and micro-adjusted dynamically, based on outdoor temperature. For accuracy, regional and local weather information is fed to, for example, processor 124 on FIG. 4 via the system's cloud management server. At the cloud, the operating software application program component acquires local temperature information (for example, from sensors or the Internet) for a given adapter device 220 (FIG. 4), in operation at its location. The adapter device processor 126 (FIG. 4) will adjust cycle rates based on industry standards for a given equipment's operating parameters at different outdoor temperatures. Seasonal adjustments will be automatic since daily, outdoor temperature and climate information are being fed to the adapter device processor continuously.

The smart device 180 application program component is designed as a web application and can be accessed via the Internet. The smart device 180 application program component works as a controller. While the application program component in the smart device controls the adapter device 220 remotely, in cooperation with the application program operational in the adapter device 220, the smart device may also be controlled by an application program component operational in the central management system 390, that is, operational in the cloud server 392. The application program component operational in the central management system 390 is programmed to run on major web browsers, with any common Internet device. The user need only log into their account and the application program is automatically downloaded for the session in which it will be utilized.

Once a user has logged out of the application program component operational on the cloud server 392, the application program component is no longer available until the user logs back into their account for another session. The adapter 220 and web-based application program is a convenient design alternative for the consumer, as it eliminates the trouble of downloading and installing a hard-coded application components onto their smart devices. The web-based application also is conveniently available to all of the consumer's personal. Internet devices automatically.

Improves Energy Efficiency of the System Through Cycling

The technical adapter system 200 includes a feature by which an amount of energy required to maintain the set temperature of a space, or multiple spaces, heated and/or cooled by the HVAC system components, is optimized to be a minimum (amount of energy). The technical adapter system 200 does this with improved or optimized cycling operation. The adapter device 220 (i.e., the application program component operational therein) calculates specific frequencies of operation of the HVAC system components during heating and cooling cycles. The cycle rate as used herein is the number of times the HVAC system component(s) is powered on and off per hour combined with the total duration the components remain on, within a given cycle. Energy efficiency is enhanced when the HVAC component power cycles exactly match the rates at which temperature changes, indicated, for example, by sensor 138, and the out-door temperature, determined, for example, via a weather channel for a given area at which the HVAC-controlled space is located. The adapter device 220 controls HVAC system component cycle rates by multiple factors, which are defined by user entry of specific data using a setup program function. The multiple factors include without limitation total cubic foot area of the HVAC-controlled space, proximate minimum and maximum occupancy, capacity output level specifications of the HVAC system, etc.

Sequence of Installation and Processor Programming of A/C, Gas Warm Air, Heat Pump Wiring Diagram FIG. 3

Basic control wiring diagram of processor 126 (FIG. 3) is programmable to setup and control an A/C with Gas Warm Air Furnace and/or Heat Pump combination systems. Eight control wire conductors are required for this FIG. 3 wiring diagram. Five conductors are required as shown on FIG. 3A without Heat Pump. The adapter device 220 can be installed as an adapter or a single stand-alone controller. FIG. 3 relay bank 122 are relays operated by processor 126 controlling system operational functions. Terminal strip 152 on FIG. 3 of conventional thermostat 150 is re-routed via conductor 154a through harness 242 via conductors 223b, on to corresponding load side of relay bank 122. Each corresponding relay on load side of relay bank 122 on FIG. 3 via conductors 223a through harness 240 via conductors 154b on to corresponding terminals on terminal strip 374 circuit board controller located in the manufacturer's HVAC equipment.

The processor's initial control setup during installation and setup of the adapter device is selected and setup on the application program portion embedded in the CPU 126, where selections are per-programmed for selecting the correct diagram to adopt and retrofit to existing HVAC control wiring. In an A/C, Gas, Oil, Warm Air, Heat Pump Wiring Diagram (FIG. 3), including wireless adapter device 220, temperature sensor 138 can control the HVAC system, which requires 8 control conductors using R/C, R/H, Y1, G, W1, W2, O and C. With most hydronic heat control systems the thermostat R/C R/H jumper is removed, then a separate existing 24V transformer is being used, the R/H and W relays controlling the hydronic heating system are isolated. The R/C transformer normally known as the cooling transformer, controls the cooling and heat pump system control circuits only. The (O/B) relay on terminal bank 122 operating reversing valve in the HVAC equipment is connected depending on N/O or N/C type reversing valve as per OEM HVAC manufacture. CPU 126 selection menu is adoptable to operating an A/C, Gas Warm Air, Hydronic Heat, Heat Pump.

CPU 126 presents a selection menu is capable of selecting and setting a control circuit operation of a heat pump system with various media, including electric re-heat to be combined and energize (W2) 2nd stage during defrost cycle, via signal from FIG. 4 current sensor 230. The adapter device 220, on board current sensor 230 (FIG. 4), during the heat pump mode, the reversing valve within the OEM heat pump unit is energized. The O/B relay located on relay bank 218 shown on FIG. 4 energizes the (O) or (B) contacts, sending power to the reversing valve. The current sensor 230 sensing current draw of the reversing valve, signals processor or CPU 126 that the heat pump is in operation. During normal heat pump operation the processor temperature sensor allows W1, W2 and T.T relays to operate for additional heat when required to satisfy load.

The heat pump integral master controller panel located internally in the OEM heat pump unit controls all heat pump operation. The master control panel sensing a required defrost event causes the reversing valve 326 to de-energize, and activates the cooling mode. During the defrost cycle event a loss of de-energized current draw is sensed by the current sensor on O/B relay, signaling the processor to energize a heating element such as a boiler, zone valve, remote or integral OEM electric heating elements 334, 330, 328, 327 on FIG. 4. At the completion of a defrost cycle the adapter 220 returns back to normal heating operation.

Figure 3A:
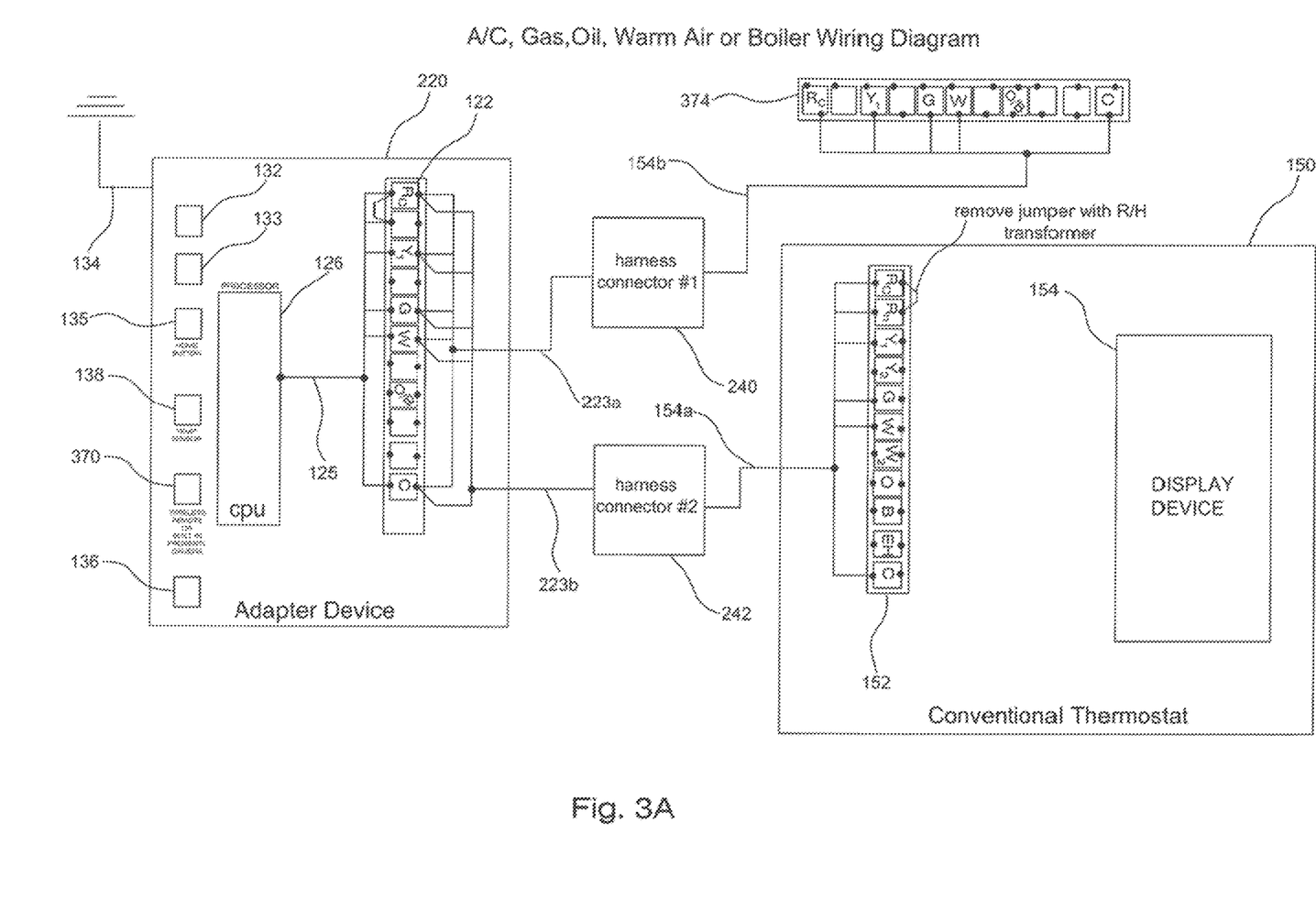
FIG. 3A presents an A/C, gas warm air, boiler wiring arrangement for use with the technical adapter system depicted in FIG. 2.

Sequence of Installation and Processor Programming of A/C, Gas Warm Air or Boiler Wiring Diagram Figure (3A)

The wiring diagram depicted in FIG. 3A requires 5 control conductors in parallel with relays 122 terminal strip 374 and terminal strip 152. This circuit can only operate an A/C, gas warm air and boiler system using a single or dual transformer, by adding or removing the jumper between R/C and R/H. During setup the adapter device 220, processor or CPU 126 implements a selection mode that allows the choice of operating a gas warm air heating system powered by a single R/C transformer for both heating or cooling or isolated R/H transformer at terminals R/H and W to control boiler and ancillary heater. Adapter device 220 also has an on board single or dual transform power source selector switch, to direct R/C power to (W) relays operating controls from an R/C single transformer source to energize a gas valve, powered boiler, circulator relay, boiler relay and electric heat elements. Adapter 220 enables toggling of R/C or R/H transformer power on to W terminals 122 when required to use separate sources of control power to terminal strip 347.

Sequence of Installation and Processor Programming of R/C, R/H, Multiple Transformers for A/C, Heat Pump, Hydronic, Boiler Circuit with Pump Zone Controller on FIG. 4

As shown in FIG. 4, processor or CPU 126 is programmed to enable selection of numerous types of control wiring seniors and combinations of systems and internally modifies a specific point to point printable diagram based on input information of existing HVAC components prior to installation of device 220, such as A/C, Heat Pump, Boiler, Zone Pump control panel, Zone Valves with end switches, also electric (or) hydronic re-heating with multiple fuels including LP gas, Propane, Geothermal, Electric Strip Heaters and other sources of fuel. Relay (R/C R/H) is shown on its normally open position disconnecting power causing the conventional thermostat 150 inoperable in order to prevent tampering and abuse of HVAC system during HOME button activation, allowing only adapter 220 to operate the system at the preset temperature point. The R/C (R/C)-(R/H) or separate R/H transformer power relay 218S1 with on-board switch 227 DP/DT NO/NC switch is in the (YES) position R/C power connected to the common (center pole) terminal to power W1 relay input to operate (W) relays on relay bank 218 using a single R/C transformer for both heating and cooling.

Constant power is input from R/C relay to terminals Y1, Y2, G and O/B. When the switch 227 is toggled to the (NO) position, power is disconnected from the R/C transformer to the W relay. This circuit allows conventional operation of an R/C transformer to energize a heat pump circuit separate of R/H powered heat circuit, such as boiler, remote heaters, pumps. Current sensor 230 measures by sensing a change of R/C power current draw during heat pump cycle operation of current of the reversing valve during a heat mode. Current sensor signals processor or CPU 126 to energize the defrost reheat control cycle powered independently by the R/H power transformer. 24V power from R/H transformer 324 connects R/H terminal of terminal block 374. R/H conductor from terminal strip 374 through harness 240 powers the R/H contacts on relay 218S1 and continues to the load side of switch 227 (NO) position. In the (NO) position the R/H power is delivered to the input side of W1 relay.

When relay 218S1 is closed power is simultaneously sent to W2 relay input. The commons (C) conductor legs of transformers 322, 324, compressor contactor, reversing valve 326 are isolated on to (C) terminal strip 374. The zone control internal transformer and existing boiler room transformer 332 common (C) conductor legs are connected to the designated relay (see FIG. 4; 327). Prior to switching relay 328 with integral power transformer connecting to W1 on terminal strip 374 and continuing to the load side of W1 relay 218S6 the R/H contacts of relay 218S1 de-energizes transformer 324 and conductor from common (center post position) of switch 227 to input terminal of W1 and W2 relay located in device 220.

When a boiler TT relay jumps W1 and W2 load side and relays W1 and W2 open, no power on input side of relays W1/W2, T1/T2 contracts create a complete circuit to control 327 isolated transformer 325 to energize boiler contactor relay 328. The T.T. relay is controlled by the temperature sensor 138 in processor 124 and toggles the start and stop of the boiler based on temperature set points. When retrofitting the wireless adapter 220 into an existing wired boiler room circuit, the existing 24V boiler room transformer 332 powers the R/H terminal on terminal strip 374 and brings power to load side of R/H relay 218S1 and continues power to R/H terminal of the conventional thermostat 150 when R/H contacts are made on relay 218S1 activating operation on the home button. When incorporating an existing boiler room transformer 332 connected with a required isolated (C) common conductor leg, connection from 332 to zone valve and (C) common conductor leg to the common leg of the coil relay of zone valve 330. The processor opens the T.T. relay jump across W1 and W2 prior to allowing the 218S1 relay to close its contacts. Closing relay 218S1 when the W2 relay is energized in a call for heat, the R/H load side of relay 218S1 travels through W2 terminal on terminal strip 374 to T1 terminal of zone relay 330 closing the contacts to power the zone valve actuator, then at the completion of the zone valve travel opening, engages the internal end switch, sending line voltage power to the circulator pump for Hydronic coil or baseboard system.

Occupancy

As mentioned, occupancy is a factor that the technical adapter system 200 relies upon for maintaining optimal HVAC cycle rates including occupied and unoccupied temperatures for the space, or sub-spaces. As human motion increases or decreases, the adapter device 220 (i.e., the application program component operational therein) determines a closely approximated number of persons present in an area. The net count of persons in the controlled space is determined by the application program component in reliance upon data from conventional devices, such as remote or built-in wireless occupancy proximity camera 370 (FIG. 2, FIG. 4). When the occupancy count changes, the adapter device 220 adjusts the temperature respectively, toward one end of the predetermined temperature set points by adjusting the average cycle rates while keeping temperature within that range.

The capacity control is accomplished by activating multiple stages of cooling or heating and reducing or increasing the cycle rates of the HVAC system, monitoring such changes in a number of persons in a fixed area, that could affect temperature, the technical adapter system 200 can include a motion sensor(s) electrically or wirelessly connected to the adapter (not expressly shown), positioned at points of entry/exit. The motion sensor (or for example, the proximity camera(s) 370 sense(s) a presence of people and communicates data to the adapter device 220. Preferably, the motion sensors are retro-reflective type photo-sensors mounted by the entrance and exit doors of a space, e.g., a store or building. The adapter device 220 receives this occupancy data and tallies a positive or negative count of persons as they pass by the sensors and walk in and out of an entrance way.

The adapter device 220 uses this occupancy data to calculate the cycle rates for a particular zone, or the entire space covered by the HVAC system. The adapter device learns the temperature patterns of the target area to efficiently adjust the HVAC system output based on the parameters input minimum and maximum during the set-up mode. Human body heat is slow to release and takes more time to reach the thermostat's thermal sensor than typical forced air or convection heat. Based on rough constants that humans output certain amounts of BTU levels of body heat, the cycling control calculation parameters to fine-tune temperature control, predicting the amount of heat to be released into the area controlled by the HVAC system (from the bodies of the persons present), the adapter device 220 (e.g., the application program component operational therein) calculates and adjusts cycle timing to avoid over heating or over cooling.

The adapter device automatically calculates and offsets the heat or a/c settings to account for the additional persons, before their body heat reaches the thermostat sensor. Once the adapter device has determined that human motion has stopped (e.g., detects a near zero persons count), the adapter device will automatically enter an unoccupied mode. The unoccupied mode has its own night-time temperature setting. The adapter device calculates the longest, possible off-time cycle rate in which to minimally satisfy the night-time temperature settings in a predetermined variable scale during setup mode, and the adapter device automatically enters the unoccupied setting. The adapter device monitors temperature and time to properly schedule the optimized preset temperature.

Advanced scheduling features allow the adapter device 220 to enter an energy saving mode during unoccupied hours. While in the energy saving mode, the adapter device may exercise HVAC equipment (i.e., HVAC system components) to test and ensure reliable operations for the entire HVAC system. Diagnostic checks are performed during regular, nighttime equipment cycles, and will only cycle HVAC equipment. If at any time during any mode of operation, the adapter device 220 detects that an HVAC system component has not satisfied the set temperature, or is otherwise not functioning as required, then an email or text message will be dispatched to the user's account/telephone number on file (preferably by the software component operational in the server 392, but also by the software components operational in the smartphone 180 or adapter 220). The consumer also can enter any email or text phone number into the display screens provided for that purpose (on the smart device 180) to change the notification address any time they need. In an embodiment, in case the Internet connection is lost, the existing conventional thermostat 150, 250 temporarily takes over control of the HVAC system from the adapter device 220.

Alternatively, the adapter device 220 may rely on data provided to it from optional, wireless occupancy proximity camera 370 (FIG. 2) positioned to capture an image of the entire target area. In this embodiment, the images are taken during operating cycles, and are compared to pre-calibrated images of an empty room within the controlled space, under various lighting conditions. The application program component operational in the adapter device 220 (or the central management system or cloud server 392, as the case may be) processes this image data every few seconds, compares the image data details and computes the number of persons, either present or moving about. The adapter device maintains a running total of persons for the target area. So, unlike conventional thermostats 150, 250, the adapter device continuously adjusts the HVAC cycles based on set up of minimum/maximum reset point range of temperature desired during occupied mode. This maintains optimal temperature control by controlling operating time within the desired minimum/maximum setup and maintaining a high degree of efficiency of a heating/cooling/ventilation system.

Using the predetermined target area dimensions and HVAC equipment specifications, the adapter device 220 calculates the optimal amount of time needed to start-up equipment, in order to have a "set" room temperature, at an exact opening starting time. This feature works in conjunction with regular schedule settings to enhance energy efficiency. The adapter device calculates the most efficient "drop-back" temperature of which to maintain during off-hours. The programmed algorithm operational in the application program component operational in the adapter device 200 (or the central management system cloud server 392 as the case may be) calculates the amount of energy it will take to bring the room area (i.e., controlled space) back to normal (i.e., pre-set) operating temperature, given the currently installed HVAC equipment component's output rates along with the target area dimensions.

The adapter device 220 (i.e., the software component operational therein) "learns" the temperature patterns within the target area and use the averages calculated in view of the patterns to determine the most efficient time/cycle needed for restoring daytime temperature. For example, when heating, if the temperature is kept too low during evenings, then the adapter device or other HVAC system controller will use too much energy at opening time to restore desired temperatures, causing not only an unnecessary energy expenditure but also unnecessary wear and tear on the HVAC equipment components. If the temperature is set too high based on system recovery learned by the adapter device 220 during unoccupied hours, then the HVAC system is simply wasting energy. To address this problem, the adapter device (application program component therein) calculates and finds the optimized temperature to maintain during unoccupied and outdoor temperatures to recover, to occupied periods. Moreover, since the adapter device 220 is an Internet capable device, it can conveniently and regularly download local weather information for the installation target area. The adapter device uses this data to enhance its ability to predict temperature change rates and other factors that could affect the changes of indoor temperature regarding onset, frequency and intensity of outdoor temperature changes.

As described, the smart device 180 connects via the Internet to set and control features of a conventional standard thermostat 150, 250 plus additional features not available with the current "smart" thermostats available on the market. The smart device 180 is therefore capable of controlling an HVAC system components beyond the ordinary "nest" thermostats by providing a multitude of wiring configurations depicted in the figures. The user can trigger a time early or later then a normal daily routine memorized by existing self programing thermostats. Simply put, the user can open his/her temperature application (on the smart device 180) and select an earlier or later time of a arrival so that technical adapter system 200 will override the general programed time. The central management server system or owner has the ability to change and hold back a system to operate in the event of abuse. So, if he or she is coming back a day earlier or later to a home or business, the user opens the application program and triggers a calendar to adjust the setting, which is presented on the display screen on the smart device 180. Providing the ability to re-set programming realizes an additional energy saving solution.

Equipment Status

The adapter device 220 (i.e., the software component operational therein) regularly updates its live status to the smart device 180 in real-time. Any change in temperature or equipment/component operation detected within the HVAC system is immediately forwarded from the adapter device 220 to the application program component operating in the smart device 180 as soon as it occurs. If an HVAC equipment component should fail on power-up, then a status of "fail" will soon be displayed instead of IDLE or RUN on the smart device 180 display screen, as the smart device application program component operated by the smart device's on-board computer realizes there is no change in room temperature after sufficient equipment run time.

Server 392

The adapter device 220 operates as an Internet based, central communications controller and user/device account manager, controlled by the central management system 390.

The central management system 390 comprises a server 392 in which a set of instructions comprising an application program implementing system management control is operational. Both the adapter device 220 and the smart device 180 connect to the server 392, as explained above. The server 392 operates as a central communications hub of which both the adapter device 220 and smart device 180 will communicate with each other. The server also maintains all of the user and device accounts information associated with each product activation and invoice.

The adapter device 220 also is configured to operate with one or more wireless HVAC (component) interface devices ("interface devices") 270 (see FIG. 2). The interface devices 270 may be equipped with current sensors to monitor HVAC system component elements, such as compressor motors, condenser motors and blower motors. The interface devices 270 are arranged at the location of HVAC system components, such as compressors, condensers, blowers, etc., without limitation. The interface devices 270 include sensors that sense amperage and other equipment operational parameters, and then send signals communicating his data to the adapter device 220 and/or the energy management system 390 at the server 392 for control of a complete HVAC system, via the smart device 180.

The interfaces 270 also control low ambient operation of the HVAC system component at which each may be positioned. In the event of a loss of Internet service, the HVAC system immediately continues to operate via hard wire connection and conversely when hard wire connection. Also, an alternate transformer may be built into the interface 270 in the event that low voltage power is lost. Typical HVAC units can be connected by a panel populated with multiple interfaces 270 in large facilities (not shown).

Wireless Thermostat System

Figure 5:
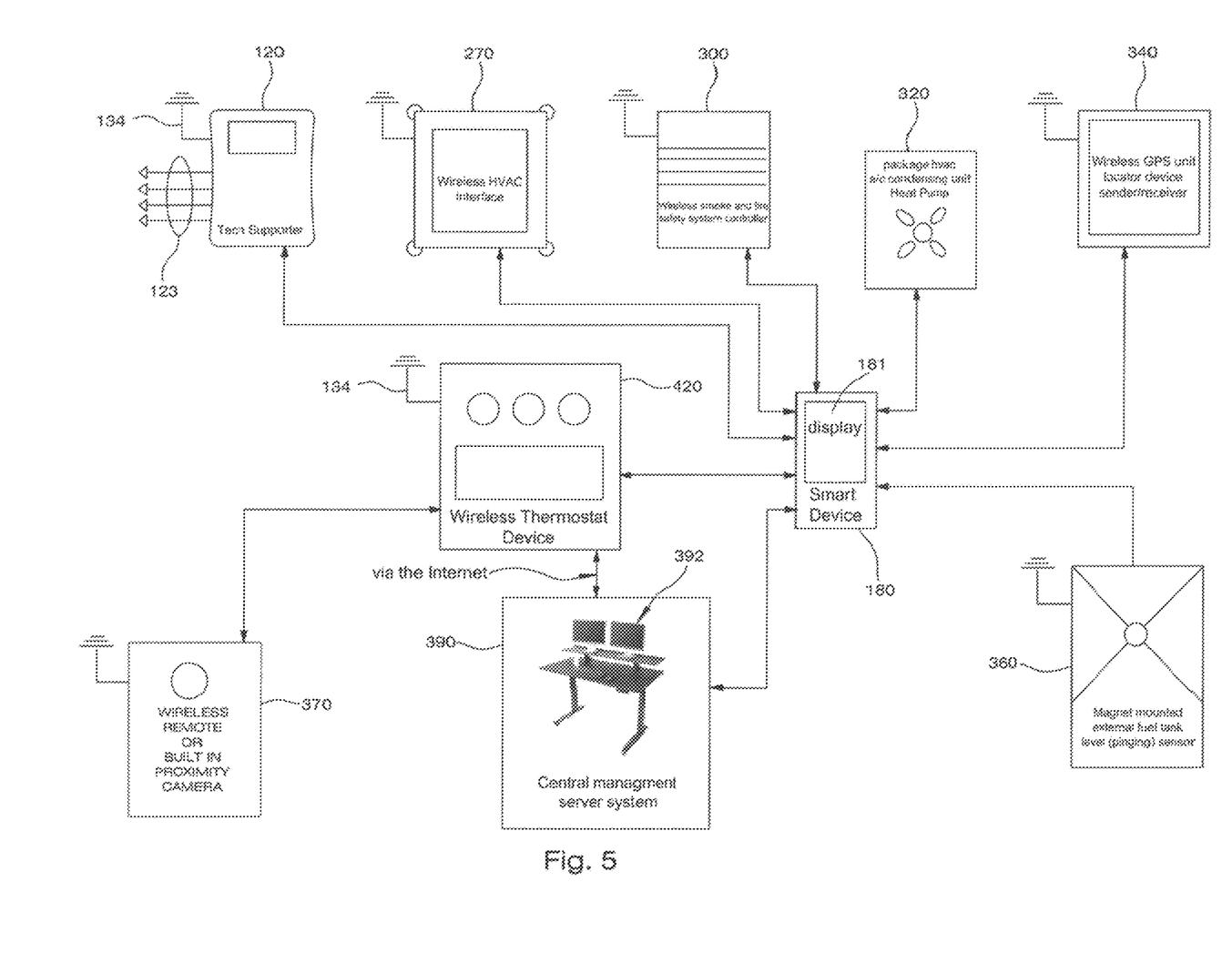
FIG. 5 presents an embodiment of a wireless thermostat system of the invention, including a wireless thermostat.

FIG. 5 depicts a wireless thermostat system 400 of the invention. Wireless thermostat system 400 comprises at a minimum a wireless thermostat device 420 (referred to commercially as the COBRA™ wireless thermostat system) and a smart device 180. The wireless thermostat system 400 preferably additionally includes a central management system 390. Central management system 390 comprises a central management server 392. Like the adapter system 200 shown in FIGS. 2, 3, 3A, the wireless thermostat system 400 operates to control several HVAC systems and components. In an embodiment, the wireless thermostat system is configured to communicate with a tech supporter device 120, one or more wireless HVAC interfaces 270 (installed at HVAC system components), a wireless police lock and smoke and fire sensor system 300, a package HVAC a/c condensing unit heat pump 320, a wireless GPS unit locator 340 (installed at HVAC system components), a magnet mounted external fuel tank level (pinging) sensor system 360 (installed in a fuel tank as the case may be), a wireless occupancy proximity camera 370, and the central management system 390, via smart device 180.

The wireless GPS unit locator 340 (FIG. 2), wireless sender/receiver wireless GPS unit locator device APP is incorporated with or without device item numbers 120, 180, 220, 270, 300, 320, 360 on FIG. 2. The wireless GPS unit locator 340 improves and simplifies the process of locating HVAC units in concealed spaces, e.g., drop ceilings, mechanical rooms, roof tops of hospitals, high rise office buildings and such. The wireless GPS unit locator 340 reduces time and effort in locating HVAC equipment, liquid fuel tanks and other concealed equipment in critical locations by not having to remove ceiling tiles, access doors, access, fire walls causing unnecessary damage and repair in these areas. Each HVAC unit is equipped with a signaling device that communicates with the specific temperature controller operating that particular HVAC unit location. Each sending device 340 and each corresponding temperature controller are twined together having the exact communication I.D. serial numbers. At initial setup of the locator and temperature control a link is created either by USB, QR bar code, scanner or other methods. At completion of linking devices the sending unit is installed into the HVAC unit and powered.

A battery backup within the device will continue in the event of a power failure. In the completion of each linking of the devices creates a GPS path from the temperature controller to the HVAC unit as the technician follows the path from point A to point B and stores the information at the central BMS system (Building Management System), The BMS system has the ability to create a printable GPS mapping locations of equipment for future use. The wireless liquid fuel level (pinging) sensor 360 FIG. 2 measures liquid level content of fuel within a fuel storage tank. The device is mounted magnetically on to the exterior steel storage fuel tank. The devices ability to ping and receive a signal of a change in sound caused by interior liquid volume. As the volume reaches below the predetermined level of where the pinging device is positioned and a change in sound infrequence energizes the device to deliver an electronic message over to the BMS management system, to effectuate an improved fuel delivery system beyond today's average degree days method of fuel delivery calculations.

Figure 6:
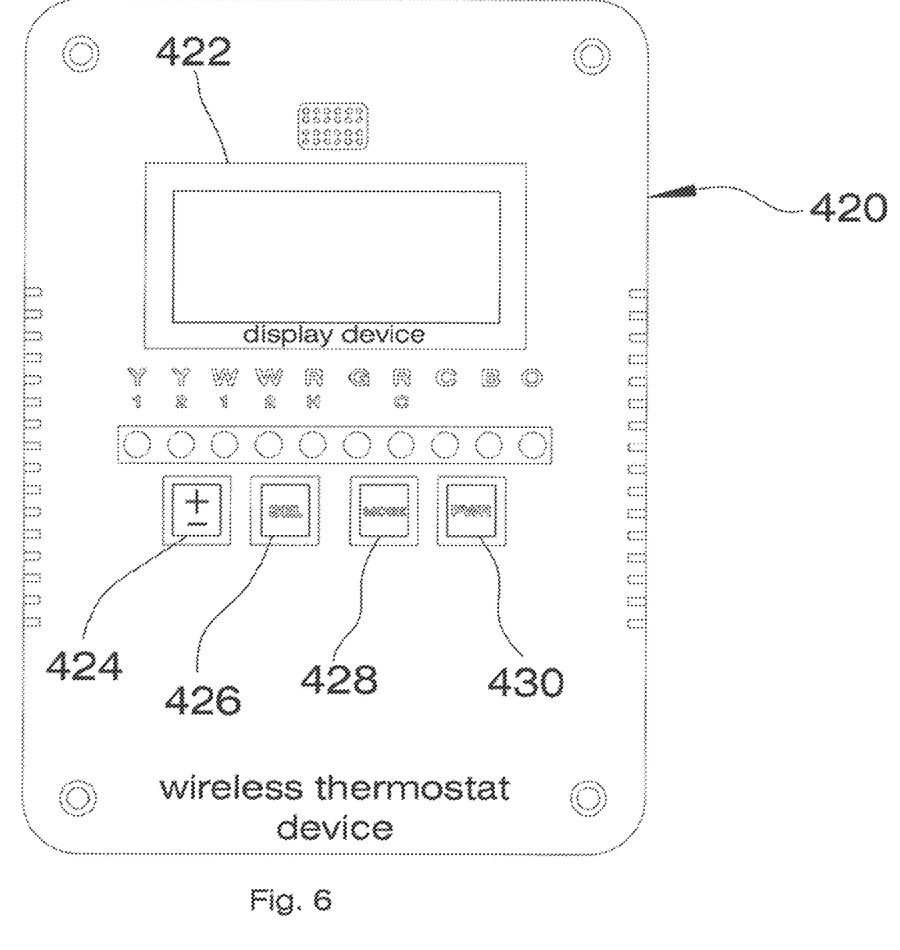
FIG. 6 depicts one embodiment of the wireless thermostat included in the wireless thermostat system.

The wireless thermostat device 420 includes a display device 422. The wireless thermostat device may include an input device, such as a keyboard (not shown), or may alternatively operate a virtual keyboard, or other virtual input device, to allow a user to input data, such as command, directly at the device 420. Of course the system 400 also allows a user to input commands to the wireless thermostat device 420 via the smart device 180, as explained in detail above. The thermostat device also includes a number of hard wired activation buttons, such as join 424, select (sel) 426, mode 428 and power (PWR) 430. These are highlighted in the exemplary embodiment of the wireless thermostat device depicted in detail in FIG. 6.

Please note that the wireless thermostat system 400, and wireless thermostat 420, operate as do the adapter system 200, and adapter device 220, except that the wireless thermostat device includes a display device 422 and other elements, and obviates a need for a conventional thermostat 150. Preferably, wireless thermostat device is used in new constructions, or to totally replace conventional thermostats.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A technical adapter system for wirelessly and remotely controlling a conventional thermostat and/or components of an HVAC and/or HVAC/R system to which the conventional thermostat is connected and set with conventional thermostat settings, and optimizing energy efficiency of the components of the HVAC and/or HVAC system, thereby effectively heating and/or cooling a space or volume that the HVAC and/or HVAC/R system is configured to heat and/or cool, the technical adapter system comprising:

an adapter device including a processor, a memory and an adapter application program component, the adapter device configured to connect to the conventional thermostat and implements an override function that overrides the conventional thermostat settings to directly control the components of the HVAC and/or HVAC/R system; and a hand-held electronic device including a smart device application program component that operates to enable a hand-held electronic device user to wirelessly connect to the adapter device, and remotely control and command the adapter device.

2. The technical adapter device of claim 1, further comprising a central management system, wherein the central management system comprises a computer server and a management system application program component that during operation, forms a direct communication with the smart device application program component operational in the hand-held electronic device.

3. The technical adapter device of claim 1, further comprising a first connector that effects connection of the adapter device to the HVAC and/or HVAC/R system components and a second connector that effects connection of the adapter device to the conventional thermostat wherein the first and second connectors together effectively bypass a wire configuration between the conventional thermostat and the components of the HVAC and/or HVAC/R system.

4. The technical adapter system of claim 1, further comprising a technical support device configured to connect to conductors connecting the conventional thermostat to the components of the HVAC and/or HVAC/R system, wherein the technical support device includes means for communicating wirelessly to the hand-held electronic device and a support device application program component configured to be controlled by the smart device application program component to implement monitoring functions, and testing functions, on the components of the HVAC and/or HVAC/R system.

5. The technical adapter system of claim 1, wherein the technical adapter system further comprises a current sensor that detects temperature relied upon to energize heating elements during a defrost cycle thereby tempering cool air produced by a heat pump system during said defrost cycle, and providing beat-pump data to the smart device.

6. The technical adapter system of claim 1, further comprising at least one wireless GPS unit locator, the Ci PS Unit locator configured for connecting to an HVAC system component, wirelessly communicating with a hand-held electronic, smart device to the central management server system, recording coordinates data for each of said HVAC system component, downloading the coordinates data onto architectural, as-built drawings to support identifying a location of said HVAC system component.

7. The technical adapter system of claim 1, further comprising a magnet mounted external fuel tank sensor, adapted to be connected to a fuel tank, and configured for wirelessly communicating to the hand-held electronic device and the smart device application program component operational therein an amount of fuel in the fuel tank.

8. The technical adapter system of claim 1, further comprising a wireless occupancy proximity camera arranged to monitor persons coming, and going from the space or volume for which the HVAC and/or HVAC/R system is intended to heat and/or cool, and for wirelessly communicating a number of persons and/or a time that each of a number or persons is present in the space or volume to the hand-held electronic device and the smart device application program component operational therein.

9. The technical adapter system of claim 1, wherein the adapter application program component, the smart device application program component or both, implement a cycling function to optimize energy efficiency of the HVAC and/or HVAC/R system during occupied/unoccupied periods.

10. The technical adapter system of claim 9, wherein the cycling function relies on occupancy data, internal temperature conditions and real time weather conditions.

11. The technical adapter system of claim 10, wherein the adapter application program component, the smart device application program component or both, modifies cycle rates along with temperature settings, during periods where the zone or space that the components of the HVAC and/or HVAC/R system are configured to heat and/or cool is occupied and unoccupied, using a preset sliding, temperature scale of minimum and maximum range of settings by increasing or decreasing cycle rates based on time-varying parameters.

12. The technical adapter system of claim 11, herein the time-varying parameters are selected from a group consisting of: information of outdoor ambient temperature received from local internet weather channels, current occupancy, motion sensors data, on board temperature sensors and remote proximity camera conditions.

13. The technical adapter system of claim 11, wherein during operation of an initial setup function, the adapter application program component, the smart device application program component or both calculate HVAC and/or HVAC/R system component capacity required for conditioning occupied space based on square footage, volume and/or minimum and maximum occupancy, to allow the adapter system to frequently adjust output rates during occupied and unoccupied periods, to optimize energy efficiency.

14. The technical adapter system of claim 11, wherein during operation of an initial setup function, the adapter application programming component, the smart device application program component or both of an HVAC and/or HVAC/R system's capacity required to condition occupied space based on cycle operating time to satisfy a temperature set point based on one or more of a square footage, a volume, a minimum and maximum occupancy of the occupied space and weather conditions outside the occupied space.

15. The technical adapter system of claim 14, wherein the adapter system stores each unique cycle event and load condition and during a current cycle runtime, compares the current cycle data against the memory-stored data, and external load conditions, to determine optimal HVAC and/or HVAC/R operation.

16. The technical adapter system of claim 1, wherein the adapter device further includes on-board relays controlled by the adapter application program component to enable various types of control circuit wiring utilizing a single or dual, independent transformer circuit to energize cooling and heating when independent control power is required to connect auxiliary, boilers, remote duct heaters, boiler pumps and other beating devices for heating applications without requiring additional isolation relays.

17. The technical adapter system of claim 1, wherein the adapter device includes on-board relays to operate heat pumps using two independent transformers, a primary transformer to operate a basic heat pump compressor and air handler, while a second transformer independently operates auxiliary heating devices to reheat cold air flow during a defrost cycle of a heat pump system, and wherein during a defrost cycle, an on-board relay, senses a change of current and energizes a heating device.

18. The technical adapter system of claim 1, wherein the adapter device is a stand-alone device and mounted and connected directly to existing HVAC equipment.

* * * * *